United States Patent [19]

Gordon

[11] 3,913,927
[45] Oct. 21, 1975

[54] SEALING BOUNDARY GASKET FOR SEALING BETWEEN METAL MEMBERS THAT ARE HELD TOGETHER BY BOLTS

[75] Inventor: Alexander L. Gordon, Worcester, Mass.

[73] Assignee: Federal-Mogul Corporation, Southfield, Mich.

[22] Filed: Oct. 3, 1973

[21] Appl. No.: 403,001

[52] U.S. Cl............. 277/166; 277/168; 277/235 B; 123/90.37; 123/90.38
[51] Int. Cl.²......................................... F16J 15/00
[58] Field of Search........ 277/166, 235 B, 236, 237, 277/168, 179; 123/90.37, 90.38; 285/363, 368

[56] References Cited
UNITED STATES PATENTS

| | | | |
|---|---|---|---|
| 2,055,103 | 9/1936 | Hewitt | 277/235 B |
| 2,981,247 | 4/1961 | Gaebler | 123/90.38 X |
| 3,653,673 | 4/1972 | Green | 277/211 X |
| 3,784,212 | 1/1974 | Doerfling | 277/235 B X |

FOREIGN PATENTS OR APPLICATIONS

| | | | |
|---|---|---|---|
| 1,045,746 | 12/1958 | Germany | 277/166 |

Primary Examiner—Rlchard E. Aegerter
Assistant Examiner—L. Footland
Attorney, Agent, or Firm—Owen, Wickersham & Erickson

[57] ABSTRACT

A sealing boundary gasket for use between two metal members at least one of which is stamped and which are held together by a plurality of bolts to seal an enclosed space defined by two longitudinal portions and two end portions. The stamped metal member tends to bend in toward the other metal member at the bolts when the bolts are tightened. The gasket is an integral one-piece, molded elastomeric member including a plurality of bolt-receiving through openings. There may be two lengthwise strip portions having the bolt openings in them, while two end strip portions may not have any bolt openings. The thickness of the strip portions having the bolt openings in them varies from a uniform thickness at the bolt openings by a gradually increasing thickness that becomes a maximum at the locations which are farthest from the bolt openings. The end portions, if they have no bolt openings in them, may be the same thickness as the thickest parts of the lengthwise portions. The changes in thickness are sufficient to compensate for the bending in of the stamped members at the bolts and thereby provide even sealing pressures along the complete periphery.

4 Claims, 5 Drawing Figures

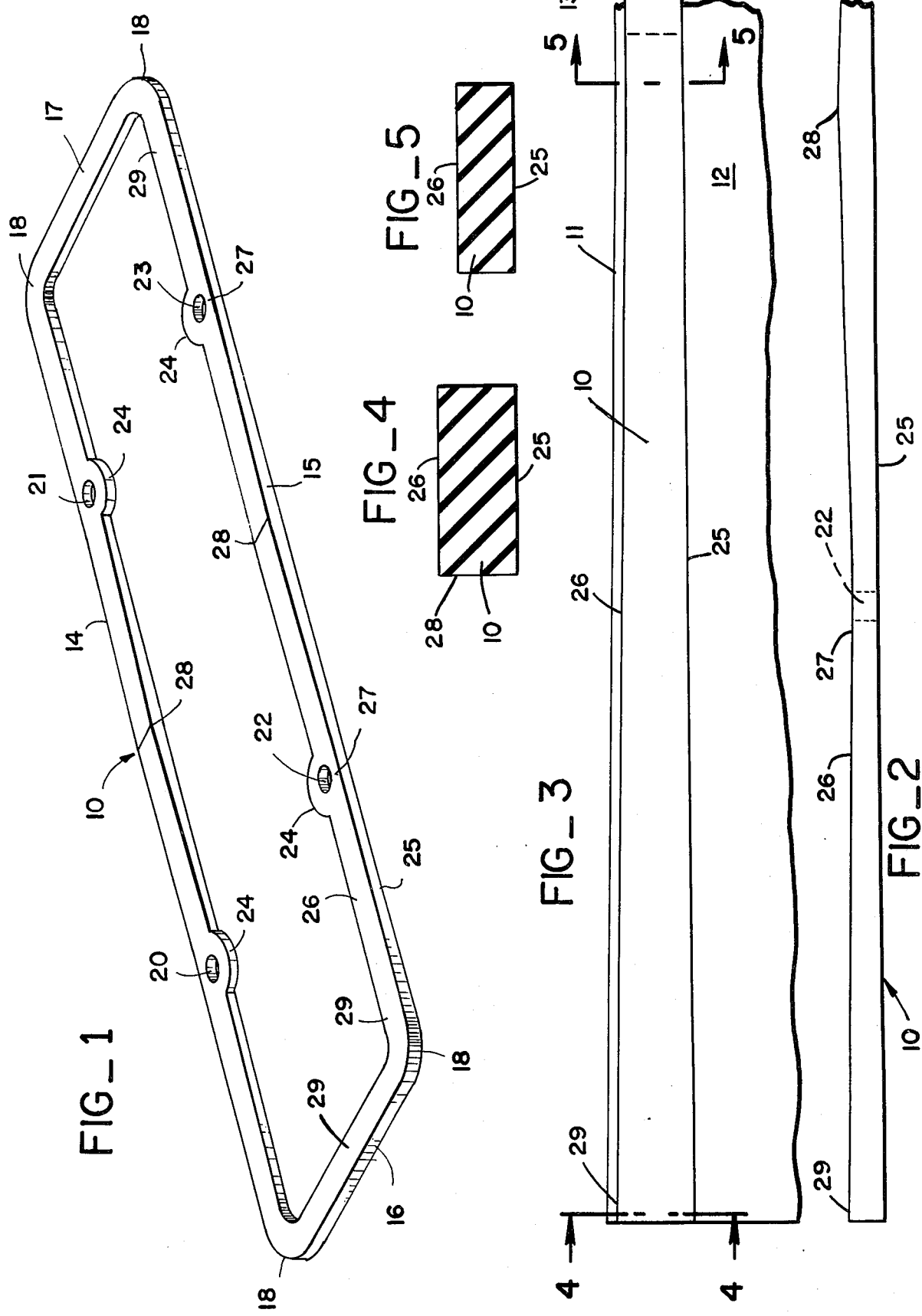

3,913,927

SEALING BOUNDARY GASKET FOR SEALING BETWEEN METAL MEMBERS THAT ARE HELD TOGETHER BY BOLTS

BACKGROUND OF THE INVENTION

This invention relates to a boundary sealing gasket which seals between two metal members, at least one of which is thin enough so that it tends to bend in toward the other member when bolt pressure is applied, the bending being at a maximum where the bolts are located.

A typical instance of where such a gasket is useful, is the gasket for the valve rocker cover of an automobile engine. Such valve rocker covers of course differ from each other; some of them have many bolts, so that the stamping which goes over the cylinder head is held fairly flat, but in some of these assemblies there are only four bolts, two along each longitudinal edge of a quite elongated rectangle.

Heretofore, such valve cover gaskets have typically been made from cork composition or from cork and rubber combinations. They have been made in flat sheets of constant thickness and then stamped out to shape by dies. This has been an economical way to make gaskets in some instances, since unused cork composition that has been stamped out can be reworked and reused. It has been felt that such gaskets would, by their resiliency be able adequately to compensate for variations in the thickness of the gap between the edge of the valve rocker cover and the edge of the cylinder head. However, this has not proved to be completely the case; there has been a tendency for such gaskets to permit leakage at the spaces farthest from the bolt openings. In any event, the compression loads on the gaskets have varied substantially around the gasket's perimeter.

SUMMARY OF THE INVENTION

The present invention provides a molded one-piece integral elastomeric gasket which encircles a rim and covers a complete substantially rectangular periphery, having two longitudinal portions and two end portions that join the longitudinal portions together. The gasket contains bolt openings which are completely surrounded by elastomer, so that they encircle the bolts that are used, typically two bolts along each longitudinal edge both well spaced in from the ends at about one-quarter the distance from the ends. The gasket may be made by injection molding or compression molding to exactly the shape required. An important feature of the invention is that the thickness of the gasket varies. It may appear to the eye to be substantially flat but actually the gasket is thinnest at the bolt openings and thickest at the places most remote from the bolt openings. The thickness is carefully calculated and is made to compensate substantially exactly for the difference in pressure applied, due to the bending of the stamped member. The end portions may be substantially constant in thickness, being of the thickness of the very ends of the two longitudinal portions. The gasket may, if the parts between which it is installed permit, be symmetrical both end-to-end and upside down.

This invention therefore provides for better sealing and does so in an economical way.

BRIEF DESCRIPTION OF THE DRAWINGS

In the drawings:

FIG. 1 is a view in perspective of a boundary sealing gasket embodying the principles of the invention and defining the rim of an elongated rectangular space.

FIG. 2 is a view in side elevation taken along one of the longitudinal edges of the gasket for a little more than half the length of the gasket and showing how the thickness of the gasket varies.

FIG. 3 is an enlargement of the left half of FIG. 2, the thicknesses being somewhat exaggerated, and the gasket is shown between a cylinder head (broken off to conserve space) and a stamped valve cover.

FIG. 4 is a view in section of the gasket taken along the line 4—4 in FIG. 3.

FIG. 5 is a view in section of the gasket taken along the line 5—5 in FIG. 3.

DESCRIPTION OF A PREFERRED EMBODIMENT

The invention may be illustrated by a gasket 10 shown in FIG. 1, this gasket being suited to a particular automobile in which a stamped metal valve rocker cover 11 (FIG. 3) is secured to a cylinder head 12 (which is generally cast and may or may not be machined) by only four bolts 13. The purpose of the gasket 10 is to seal the space inside along the edges where the rims of the two members 11 and 12 meet. Thus, the gasket 10 has a pair of longitudinal portions 14 and 15 which are substantially alike and are symmetric to each other, and these are joined together by end portions 16 and 17, the corners 18 being usually rounded. Along each longitudinal portion 14 are two bolt openings 20 and 21 and there are two bolt openings 22 and 23 along the portion 15. At each of these bolt openings the gasket 10 is provided with a wider portion 24 to be sure that each bolt opening is completely encircled by elastomer of sufficient width to stand any strain it might be required to withstand.

One novel feature of the present invention is that the gasket 10 is an integral member that is molded to its exact shape. It is made of elastomeric material and while this may seem to be expensive, it becomes economical in large volume production, especially when injection molding is used, as it can be. This enables the formation of an exact and precision-made gasket 10 which is dimensioned much more accurately than a gasket cut out from a sheet can be and which can have special variations.

Thus, the gasket 10 is provided with a flat lower surface 25 and an upper surface 26 which slopes from place to place, depending on the distance from the bolt openings. The difference is not enough in view of the elastomeric nature of the gasket 10 to require installation in a particular manner; it may be put on upside down without mattering. Thus, FIGS. 2 and 3 show how the gasket 10 is thinnest at the bolt openings, at portions 27, and is thickest at portions remote therefrom, as at the portions 28 in the middle of the longitudinal portions 15 and 16 and at the end portions at 29. The differences between the thicknesses 27 and 28 and 29 has purposely been exaggerated to depict the principle involved. Actually the difference between the thickness of the portion 27 and the thickness of the portion 28 is in the order of magnitude of 0.030 inch to 0.050 inch, whereas the thickness of the gasket 10 itself at the thinnest portion is approximately 0.150 inch. However, this amount has been calculated to be the correct amount to compensate for the bending of the stamped metal member 11 (such as a valve cover) with which the device is used.

As a result of the exact molded-to-shape construction this gasket 10 is able to compensate for the variations in thickness that occur during the tightening of the bolts 13. The supposedly flat metal members 11 and 12 may be exactly flat as made, but since there is some bending of at least the member 11 during the tightening of the bolts 13, the member 11 is no longer flat when the bolts 13 are tight. However, the bowing-in of the stamped member 11 is exactly compensated for by the shape of the gasket 10 and its variation in thickness, so that the sealing pressure is uniform along the complete periphery.

While the invention has been shown as applied to an elongated rectangular shape of space, the gasket can apply also to other shapes of flanges, including ovals and even circles, where the bolt openings are spaced apart relatively far and where there are a relatively small number of bolts and where there is to be some bending of at least one of the metal members. Also, the sloping, instead of being all on one face 26 can be on both faces, for both metal members 11 and 12 may actually flex inwardly at the bolt openings, but it has been illustrated here in the manner shown because that is not normally the case.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A sealing boundary gasket for sealing between two members at least one of which is relatively thin and that are held together by a plurality of fastener means, spaced well apart from each other, to seal around an enclosed space, the thin member tending to bend in toward the other member adjacent to the fastener means when the fastener means is tightened, comprising an integral one-piece molded elastomeric member uniform in composition throughout having a plurality of openings completely surrounded by elastomer, each for receiving a said fastener means, the thickness of said elastomeric member in between said openings varying linearly in a lengthwise direction from a uniform minimum thickness at each said opening and gradually increasing uniformly in thickness to a maximum at the loci which are farthest from a said opening, the thicknesses being uniform along any section transverse to said lengthwise direction.

the changes in thickness being of an amount to compensate for the bending-in of the thin metal member at the fastener means and to provide an even sealing pressure along the complete periphery.

2. A sealing boundary gasket for sealing between two metal members, at least one of which is a thin stamped member, that are held together by a plurality of bolts, spaced well apart from each other, to seal around an enclosed space defined by two longitudinal portions and two end portions, the stamped metal member tending to bend in toward the other metal member adjacent to the bolts when the bolts are tightened, comprising an integral one-piece molded elastomeric member which is completely uniform in composition at all places having two lengthwise strip portions including a plurality of bolt-receiving openings each completely surrounded by elastomer, and two end strip portions joining said lengthwise portions, the thickness of said lengthwise strip portions sloping uniformly from a uniform minimum thickness at each said bolt opening and gradually increasing uniformly in thickness to a maximum at the loci which are farthest from a said bolt opening, the thickness across any transverse section through said lengthwise strip portions being constant, the thickness of said end strip portions being uniform and being the thickness of the ends of the lengthwise strip portions which they join, the changes in thickness being of an amount to compensate for the bending-in of the stamped members at the bolts and to provide an even sealing pressure along the complete periphery.

3. A sealing boundary gasket for sealing between two metal members at least one of which is a thin stamped member, that are held together by four bolts, spaced well apart from each other, to seal around an enclosed rectangular space defined by two straight longitudinal portions and two straight end portions, the stamped metal member tending to bend in toward the other metal member adjacent to the bolts when the bolts are tightened, comprising an integral one-piece molded elastomeric rectangular member which is uniform in composition at all points having two straight lengthwise strip portions, each of which has a pair of bolt-receiving openings completely surrounded by elastomer, spaced in from the ends by about one-quarter the length of said lengthwise portion, and two straight end strip portions joining said lengthwise portions, the thickness of said lengthwise strip portions varying from a uniform minimum thickness at each said bolt opening and gradually increasing uniformly in thickness to a maximum at the loci which are farthest from said bolt opening, the thickness across any transverse section being uniform, the thickness of said end strip portions being uniform and being the thickness of the ends of the lengthwise strip portions, which they join, the changes in thickness being of an amount to compensate for the bending-in of the stamped member adjacent to the bolts and thereby to provide an even sealing pressure along the complete periphery.

4. A sealing arrangement, comprising two metal members, one of which is a relatively thin stamped member, a plurality of bolts spaced well apart from each other urging said metal members together around an enclosed space, the stamped metal member tending to bend in toward the other metal member adjacent to the bolts when the bolts are tightened, an integral one-piece molded elastomeric member of uniform composition throughout having a plurality of boltreceiving openings completely surrounded by elastomer, the thickness of said gasket varying in a lengthwise direction from a uniform minimum thickness at each said bolt opening and gradually increasing uniformly in thickness to a maximum at the loci which are farthest from a said bolt opening, the thicknesses being uniform along any section transverse to said lengthwise direction, the changes in thickness being of an amount to compensate for the bending-in of said stamped member adjacent to the bolts and to provide an even sealing pressure along the complete periphery.

* * * * *